(12) United States Patent
Okada et al.

(10) Patent No.: US 10,005,116 B2
(45) Date of Patent: Jun. 26, 2018

(54) HIGH FREQUENCY INDUCTION HEATING APPARATUS AND PROCESSING APPARATUS

(71) Applicant: NIPPON STEEL & SUMITOMO METAL CORPORATION, Tokyo (JP)

(72) Inventors: Nobuhiro Okada, Kisarazu (JP); Atsushi Tomizawa, Nago (JP); Hiroaki Kubota, Kisarazu (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 519 days.

(21) Appl. No.: 14/427,075

(22) PCT Filed: Sep. 11, 2013

(86) PCT No.: PCT/JP2013/074580
§ 371 (c)(1),
(2) Date: Mar. 10, 2015

(87) PCT Pub. No.: WO2014/045976
PCT Pub. Date: Mar. 27, 2014

(65) Prior Publication Data
US 2015/0239028 A1 Aug. 27, 2015

(30) Foreign Application Priority Data
Sep. 21, 2012 (JP) .................. 2012-208601

(51) Int. Cl.
*B21D 7/16* (2006.01)
*H05B 6/10* (2006.01)
(Continued)

(52) U.S. Cl.
CPC ............. *B21D 7/162* (2013.01); *B21D 7/165* (2013.01); *C21D 1/42* (2013.01); *C21D 9/00* (2013.01);
(Continued)

(58) Field of Classification Search
CPC ........ B21D 7/162; B21D 7/165; H05B 6/104; H05B 6/36; H05B 6/101; H05B 6/365;
(Continued)

(56) References Cited

U.S. PATENT DOCUMENTS 7,442,906 B2 * 10/2008 Tanaka ............... C21D 1/42
148/572
2008/0066517 A1 3/2008 Tomizawa et al.
2013/0175260 A1 7/2013 Saiki et al.

FOREIGN PATENT DOCUMENTS

JP 2005-100935 4/2005
JP 2005100935 A * 4/2005
(Continued)

*Primary Examiner* — David Angwin
*Assistant Examiner* — John J Norton
(74) *Attorney, Agent, or Firm* — Clark & Brody

(57) ABSTRACT

Provided is a high frequency induction heating apparatus capable of quenching a workpiece having an outward flange, over the whole circumference by means of a frequency with which a penetration depth of an electromagnetic wave is larger than a sheet thickness of the workpiece The high frequency induction heating apparatus includes a high frequency induction heating coil used for heating a long hollow steel workpiece having a closed cross section and an outward flange, in 3DQ in which a bending member is manufactured from the workpiece The high frequency induction heating coil includes a magnetic material core facing each other between which both faces of the outward flange are interposed, having a distance from both faces, and an induction heating coil connected to the magnetic material core and arranged surrounding an outer circumference of a general portion where the outward flange is excluded from the workpiece.

4 Claims, 14 Drawing Sheets

(51) Int. Cl.
  *H05B 6/36* (2006.01)
  *H05B 6/40* (2006.01)
  *H05B 6/44* (2006.01)
  *C21D 9/08* (2006.01)
  *C21D 1/42* (2006.01)
  *C21D 9/00* (2006.01)
  *F27D 11/06* (2006.01)
  *F27D 11/12* (2006.01)

(52) U.S. Cl.
  CPC .............. *C21D 9/0075* (2013.01); *C21D 9/08* (2013.01); *F27D 11/06* (2013.01); *F27D 11/12* (2013.01); *H05B 6/101* (2013.01); *H05B 6/104* (2013.01); *H05B 6/36* (2013.01); *H05B 6/365* (2013.01); *Y02P 10/253* (2015.11)

(58) Field of Classification Search
  CPC .......... C21D 1/42; C21D 9/0075; C21D 9/08; C21D 9/00; F27D 11/12; F27D 11/06
  USPC ......................................... 219/635, 639, 643
  See application file for complete search history.

(56) References Cited

FOREIGN PATENT DOCUMENTS

| | | |
|---|---|---|
| KR | 2004-0008085 | 1/2004 |
| KR | 2012-0099515 | 9/2012 |

\* cited by examiner

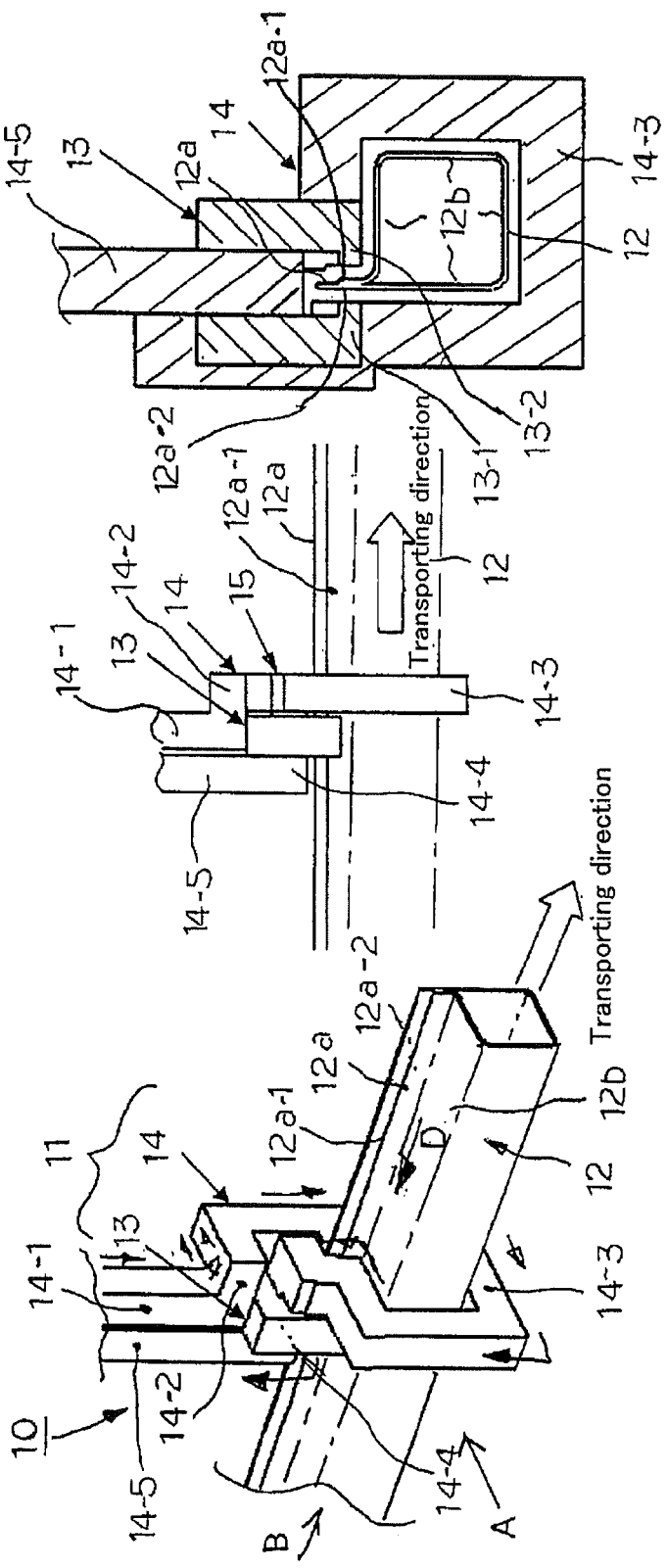

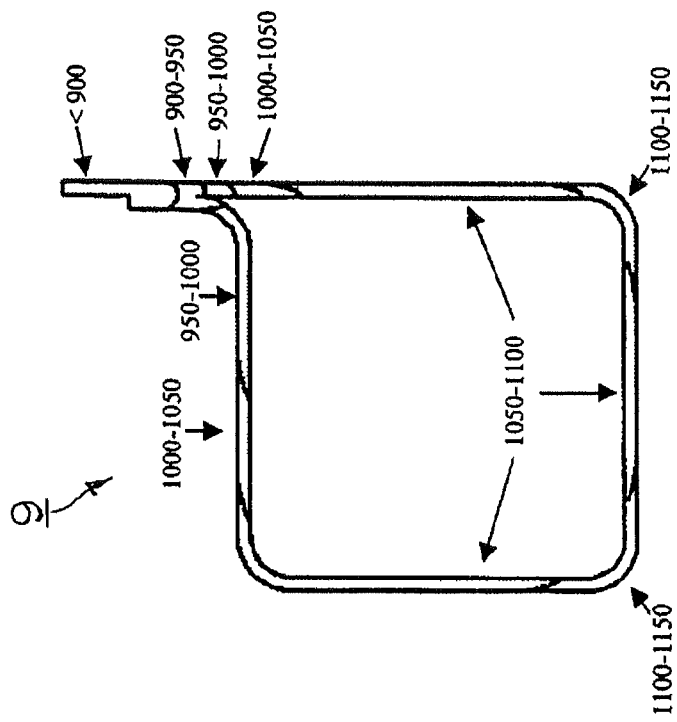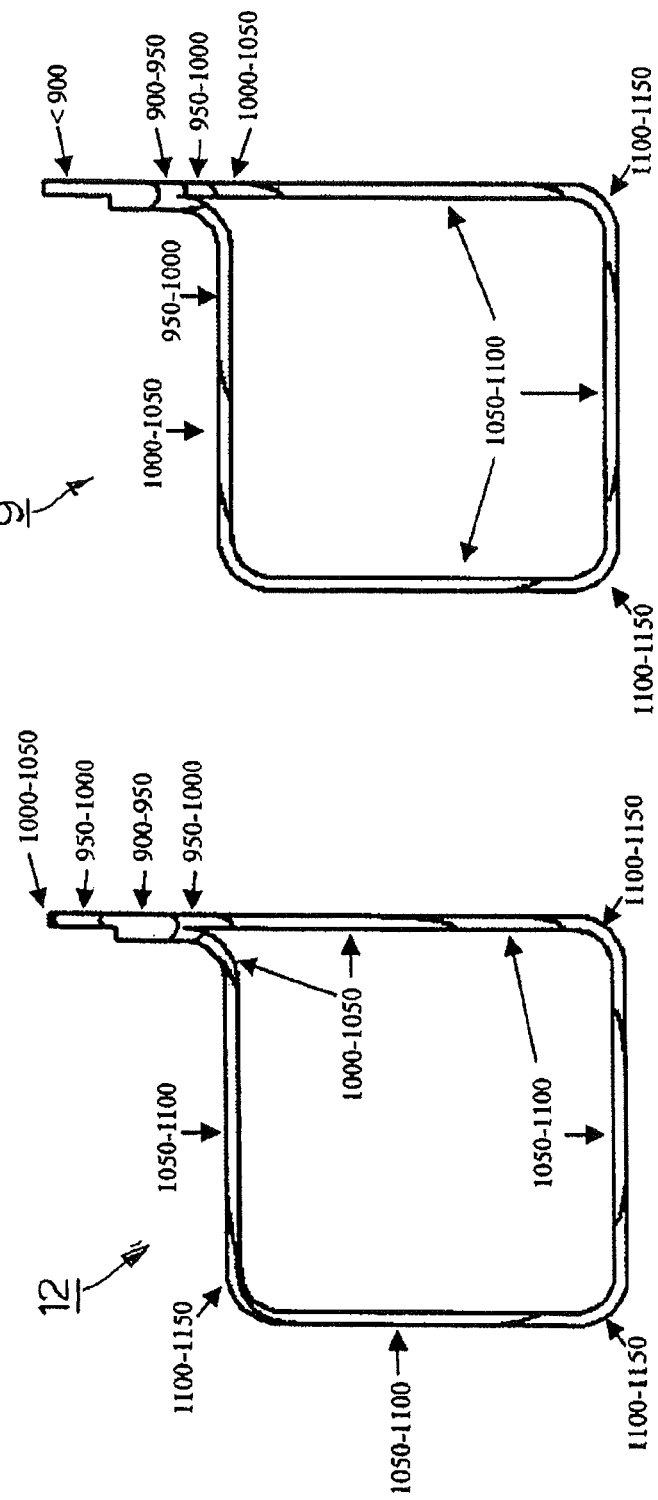

HIGH FREQUENCY INDUCTION HEATING APPARATUS AND PROCESSING APPARATUS

TECHNICAL FIELD

The present invention relates to a high frequency induction heating apparatus and a processing apparatus prepared with the high frequency induction heating apparatus. Specifically, the present invention relates to: a high frequency induction heating apparatus capable of, in carrying out a three-dimensional hot processing (hereinafter referred to as "3DQ") in which a high frequency quenching and a processing are carried out at the same time to a steel workpiece having a closed cross section and an outward flange, heating the flange to 900° C. or more and narrowing a heating range (heating width) in a longitudinal direction (transporting direction) of the workpiece, by using a frequency with which a penetration depth of an electromagnetic wave is larger than a sheet thickness of the workpiece; and a processing apparatus prepared with the high frequency induction heating apparatus.

BACKGROUND ART

In Patent Literature 1, the applicant of the present invention has previously disclosed 3DQ in which a high frequency quenching and a processing are carried out at the same time to a hollow workpiece made of steel having a closed cross section. FIG. 11 is a view showing a situation in which a bending member is produced by means of 3DQ with a processing apparatus 0.

As shown in FIG. 11, the processing apparatus 0 includes a transporting apparatus which is not shown, a supporting means 4, a high frequency induction heating apparatus 5, a water-cooling apparatus 6, and an articulated robot 7. Here, the transporting apparatus transports a long steel pipe 1 having a closed cross section in its longitudinal direction. That is, the steel pipe 1 is held by a holding unit 2, and transported in an axial direction (longitudinal direction) at a predetermined transporting speed by means of the transporting apparatus. The supporting means 4 movably holds the steel pipe 1 to be transported in the axial direction by the transporting apparatus. That is, the steel pipe 1 passes through an installation position of the support means 4 to be transported in the axial direction. The high frequency induction heating apparatus 5 partly heats the steel pipe 1 at a more downstream side in the transporting direction of the steel pipe 1 to be transported than the supporting means 4. This makes the steel pipe 1 partly and rapidly heated. The water-cooling apparatus 6 cools the heated portion at a more downstream side in the transporting direction of the steel pipe 1 than the high frequency induction heating apparatus 5. Since the steel pipe 1 is heated to a high temperature between the high frequency induction heating apparatus 5 and the water-cooling apparatus 6, its deformation resistance is largely decreased. Therefore, the heated portion of the steel pipe 1 heated by the high frequency induction heating apparatus 5 is rapidly cooled by the water-cooling apparatus 6. The articulated robot 7 moves in three-dimensional directions including at least the transporting direction of the steel pipe 1, at a more downstream side in the transporting direction of the steel pipe 1 than the water-cooling apparatus 6, while holding the steel pipe 1 to be transported with a holding means 7a. This adds a bending moment to the heated portion of the steel pipe 1 heated by the high frequency induction heating apparatus 5, whereby the metal material bends three dimensionally. By using the articulated robot 7, it is possible to movably hold the steel pipe 1 easily in three-dimensional directions including the transporting direction of the steel pipe 1.

Basically, the steel pipe 1 movably held in the axial direction by the articulated robot 7 is transported by the transporting apparatus from an upstream side to a downstream side, and at the downstream of the supporting means 4, for example a bending processing is carried out to the steel pipe 1, to thereby manufacture the bending member.

The steel pipe 1 is rapidly heated by the high frequency induction heating apparatus 5 arranged at the downstream side of the supporting means 4, to a temperature range with which the steel pipe 1 can be partly quenched. At the same time, the steel pipe 1 is rapidly cooled by the water-cooling apparatus 6 arranged at a downstream of the high frequency induction heating apparatus 5. Accordingly, a high-temperature portion (red heat portion) which moves in an axial direction being the opposite direction from the transporting direction of the steel pipe 1 is formed on the steel pipe 1. Then, the processing is carried out to the steel pipe 1, by moving the articulated robot 7 two dimensionally or three dimensionally while the steel pipe 1 is transported, to add for example a bending moment to the red heat portion.

In this regard, by adequately setting the heating temperature and cooling speed of the steel pipe 1, it is possible to quench the steel pipe 1. Therefore, according to 3DQ, it is possible to manufacture a lightweight bending member having a high intensity at high work efficiency.

FIG. 12 includes an explanation view showing a situation in which a high frequency quenching and a bending processing are simultaneously carried out by means of 3DQ, to a hollow steel workpiece 9 having a closed cross section and an outward flange 9a. FIG. 12A is a perspective view, and FIG. 12b is a cross-sectional view taken along the line C-C in FIG. 12A.

As shown in FIGS. 12A and 12B, if the workpiece 9 is tried to be heated uniformly in its circumferential direction by means of a normal high frequency induction heating apparatus 5 of a conventional technique arranged surrounding the whole circumference of the workpiece 9, it is not possible to heat the outward flange 9a of the workpiece 9. As described below, this comes from the penetration depth of an electromagnetic wave.

FIG. 13 includes an explanation view conceptually showing the reason why the outward flange 9a of the workpiece 9 is not heated. FIG. 13A shows flow directions of a coil current which flows in the high frequency induction heating coil 5 and an eddy current generated at a general portion 9b, in a case where the penetration depth of an electromagnetic wave at the general portion 9b where the outward flange 9a is excluded from the workpiece 9 is larger than the sheet thickness of the general portion 9b. FIG. 13B shows flow directions of the coil current and the eddy current in a case where the penetration depth of an electromagnetic wave at the outward flange 9a of the workpiece 9 is larger than the sheet thickness of the outward flange 9a. FIG. 13C shows flow directions of the coil current and the eddy current in a case where the penetration depth of an electromagnetic wave at the general portion 9b of the workpiece 9 is smaller than the sheet thickness of the general portion 9b. FIG. 13D shows flow directions of the coil current and the eddy current in a case where the penetration depth of an electromagnetic wave at the outward flange 9a of the workpiece 9 is smaller than the sheet thickness of the outward flange 9a.

As shown in FIGS. 13A to 13D, the eddy current generated at the workpiece 9 by the induction heating flows in a manner to be along the current flow of the heating coil of the high frequency induction heating apparatus 5 which is shown by void arrows. In this case, as shown by A part in FIG. 13B, since the eddy current mutually cancels thereby scarcely flows at the outward flange 9a, the outward flange 9a is not heated. In order to prevent this, as shown by B part in FIG. 13D, it is needed to increase the frequency of the coil current to thereby make the penetration depth of an electromagnetic wave small, in order to heat the outward flange 9a by means of the eddy current only at the vicinity of its surface layer so that the eddy current is not mutually canceled. However, if the heating is carried out as above, as is obvious, the heating efficiency decreases because only the surface layer of the general portion 9b is heated as shown in FIG. 13C. Also if the penetration depth is too small, the heat generation amount becomes insufficient whereby heating itself becomes imperfect. Therefore, in a case where the normal high frequency induction heating apparatus 5 shown in FIG. 12 is used, it is appropriate that the frequency is set in a range with which the penetration depth becomes approximately same as to ½ of the sheet thickness of the outward flange 9a Here, the penetration depth δ (m) is calculated from Formula 2. The symbol μ in Formula 2 is a magnetic permeability, μ' is a relative magnetic permeability, $\mu_0$ is a magnetic permeability in a vacuum state, ω is an angular frequency, f is the frequency, and σ is conductivity.

$$\delta(m) = \sqrt{\frac{2}{\omega \sigma \mu}} = \sqrt{\frac{2}{2\pi f \sigma \mu' \mu_0}} = 503.3 \sqrt{\frac{1}{f \sigma \mu'}} \quad (2)$$

In Formula 2, the penetration depth δ (m) of an electromagnetic wave becomes smaller as the frequency f is larger and the magnetic permeability μ or the conductivity σ is larger. A steel material is a ferromagnetic body having a relative magnetic permeability μ' of around 100 to 1000 at a room temperature; however, since the steel material loses the magnetic property at a magnetic transformation temperature (around 780° C.), the relative magnetic permeability μ' decreases to 1. That is, the penetration depth δ (m) also largely differs at the magnetic transformation temperature as a boundary.

FIG. 14 is a graph showing a relationship between the frequency and penetration depth of the current of the high frequency induction heating apparatus. In FIG. 14, in a case where the temperature is the magnetic transformation temperature or less, the relative magnetic permeability is 100 and the conductivity is $1 \times 10^7$ S/m, and in a case where the temperature is the magnetic transformation temperature or more, the relative magnetic property is 1 and the conductivity is $9 \times 10^5$ S/m.

In order to quench the steel workpiece by 3DQ, it is needed to heat the workpiece to the $A_3$ point temperature (around 900° C.) or more at which the steel transforms to austenite, and the $A_3$ point temperature is same as or higher than the magnetic transformation temperature. Therefore, when the high frequency quenching of the workpiece is carried out, it is needed to evaluate the penetration depth at a temperature of the magnetic transformation temperature or more. The graph of FIG. 14 shows that: in order to carry out a high frequency quenching to a flange having a sheet thickness of for example 1 mm, it is needed to use a frequency of 300 kHz or more with which the penetration depth becomes 1 mm or less, which is nearly same as the sheet thickness, for controlling mutual cancel of the eddy current.

However, when the heating target temperature is same in the high frequency induction heating, a power source having a higher power is needed as the frequency is larger. A high-output power source has drawbacks that its equipment cost is very expensive and operation cost also becomes expensive. Therefore, it is needed to develop a high frequency induction heating coil capable of heating a flange with a frequency with which the penetration depth at a temperature of the magnetic transformation temperature of the workpiece or more is same as or larger than the sheet thickness of the flange, by means of a low-output power source.

Patent Literature 2 discloses an invention of uniformly heating a workpiece having an outward flange, in its circumference direction by means of a high frequency induction heating coil having a shape offsetting in an axial direction of the workpiece along the outward flange of the workpiece.

CITATION LIST

Patent Literatures

Patent Literature 1: WO 2006/093006
Patent Literature 2: WO 2012/005076

SUMMARY OF INVENTION

Technical Problem

If the workpiece is heated by means of the high frequency induction heating coil having a shape offsetting in the axial direction of the workpiece which is disclosed in Patent Literature 2, the heating range (heating width) in the axial direction of the workpiece inescapably becomes wide.

However, as described above with reference to FIG. 11, in 3DQ, a processing is carried out to the steel pipe 1 for example by adding the bending moment by means of the articulated robot 7 to the high temperature portion (red heating portion) which moves in the axial direction of the steel pipe 1, the high temperature portion formed by the high frequency induction heating apparatus 5 and the water-cooling apparatus 6 arranged at the downstream of the high frequency induction heating apparatus 5. Therefore, if the heating range (heating width) in the axial direction of the steel pipe 1 becomes wide in 3DQ, the dimension accuracy of the bending member to be manufactured becomes significantly degraded. Here, the term "heating width" means an area to be heated to 800° C. or more at which the steel pipe 1 is softened, which is the area from the position at which the steel pipe 1 is heated to reach 800° C. from the vicinity of the high frequency induction heating apparatus 5, to the position at which the steel pipe 1 is cooled to reach 800° C. or less by the water-cooling apparatus 6. In order to secure the processing accuracy in 3DQ, it is needed to narrow the heating width of the steel pipe 1 as much as possible.

An object of the present invention is to provide a high frequency induction heating apparatus capable of quenching a workpiece having an outward flange, over the whole circumference by means of a frequency with which a penetration depth of an electromagnetic wave is larger than the sheet thickness of the workpiece. Specifically, an object of the present invention is to provide a high frequency induction heating apparatus capable of, in carrying out 3DQ to a steel workpiece having a closed cross section and an outward flange, heating the outward flange to 900° C. or more and narrowing the heating width of the workpiece as much as possible, with a frequency with which the penetration depth of an electromagnetic wave becomes larger than the sheet thickness of the workpiece, by means of a power-supply device having a lower output power than a power-supply device having a high output power using a frequency with which the penetration depth of an electromagnetic wave is smaller than the sheet thickness of the workpiece. Also, the present invention provides a processing apparatus prepared with the high frequency induction heating apparatus.

Solution to Problem

A first aspect of the present invention is a high frequency induction heating apparatus including a high frequency induction heating coil used for heating a long hollow steel workpiece having a closed cross section and an outward flange, in a three-dimensional hot processing of manufacturing a bending member by forming a high temperature portion which moves in a longitudinal direction of the workpiece in the workpiece and at the same time adding an external force to the high temperature portion, wherein the high frequency induction heating coil includes a magnetic material core and an induction heating coil, wherein the magnetic material core is arranged facing each other between which both faces of the outward flange are interposed, having a distance from the both faces, and the induction heating coil is connected to the magnetic material core and arranged surrounding an outer circumference of a general portion where the outward flange is excluded from the workpiece.

The magnetic material core in the present invention is for example a ferrite core, a ferromagnetic body of a Fe oxide sintered as a ceramic, and a material having a magnetic property and high electric resistance. Specifically, it has a relative magnetic permeability of preferably at least 3 or more, and an electrical resistivity of preferably at least 1 Ωm or more, and more preferably 10 Ωm or more. The material of the magnetic material core is not necessary to be limited to the ferrite core, and may be another material having a same or more degree of physical property.

In the present invention, it is preferable that the induction heating coil includes: a first portion connected to a high frequency power generator; a second portion connected to the first portion and extending in the longitudinal direction of the workpiece; a third portion connected to the second portion and arranged surrounding a circumference of the general portion of the workpiece; a fourth portion connected to the third portion and extending in the longitudinal direction of the workpiece; and a fifth portion connecting the fourth portion and the high frequency power generator, and the fifth portion is positioned on a more upstream side than the third portion in the opposite direction from a moving direction of the high temperature portion (transporting direction of the workpiece).

In this case, for example, the current which flows in the second portion and the current which flows in the fourth portion flow in the opposite direction from each other.

In the present invention, it is preferable that the magnetic material core includes two portions parallel to the outward flange that are provided on a downstream side in the moving direction of the high temperature portion of the workpiece. The two portions are preferably arranged such that a magnetic flux penetrates to the outward flange, most preferably arranged such that the magnetic flux is generated in a substantially vertical direction to the outward flange, and the magnetic core is arranged between the second portion and the fourth portion in a manner to cross the fourth portion.

In the present invention, the magnetic material core is preferably arranged only on a more downstream side in the moving direction of the high temperature portion than the third portion.

Further, preferably the following Formula 1 is satisfied, wherein L (mm) is the length of the magnetic material core in the longitudinal direction of the work piece, f (kHz) is the current frequency of the induction heating coil, and v (mm/s) is the moving speed of the high temperature portion of the workpiece (transporting speed of the workpiece).

$$\frac{21}{f}\sqrt{V} < L < \frac{35}{f}\sqrt{V} \qquad (1)$$

A second aspect of the present invention is a processing apparatus which carries out a three-dimensional hot processing of manufacturing a bending member by forming a high temperature portion which moves in a longitudinal direction of a hollow steel workpiece in the workpiece, and at the same time by adding an external force to the high temperature portion, the processing apparatus including: the high frequency induction heating apparatus of the first embodiment; a cooling apparatus arranged on a downstream side of the high frequency induction heating apparatus; and an apparatus arranged on a downstream side of the cooling apparatus and supporting the workpiece to add the external force to the workpiece.

Advantageous Effect of Invention

According to the present invention, a high frequency induction heating apparatus capable of quenching a workpiece having an outward flange, over whole circumference of the workpiece by means of a frequency with which the penetration depth of an electromagnetic wave is larger than the sheet thickness of the workpiece, is provided. Specifically, according to the present invention, a high frequency induction heating apparatus capable of, in carrying out 3DQ to a steel workpiece having a closed cross section and an outward flange, heating the outward flange to 900° C. or more and narrowing the heating width of the workpiece as much as possible, by means of a frequency with which the penetration depth of an electromagnetic wave is larger than the sheet thickness of the workpiece, is provided. Also, by employing the high frequency induction heating apparatus fora processing apparatus, it becomes also possible for the processing apparatus to exert the same effect as that of the high frequency induction heating apparatus.

BRIEF DESCRIPTION OF DRAWINGS

FIG. 1 includes an explanation drawing showing a high frequency induction heating coil of the high frequency induction heating apparatus according to the present invention;

FIG. 1A is a perspective view;

FIG. 1B is a view seen from a direction of the arrow A in FIG. 1A; and

FIG. 1C is a view seen from a direction of the arrow B in FIG. 1A;

FIG. 2 includes an explanation drawing showing the principle of heating an outward flange by means of the present invention;

FIG. 3 includes a graph showing calculation results by a numerical analysis in a case where a conventional high frequency induction heating coil shown in FIGS. 12A and 12B is used;

FIG. 4 includes a graph showing calculation results by a numerical analysis in a case where the high frequency induction heating coil according to the present invention shown in FIGS. 1A to 1C is used;

FIG. 10 includes an explanation drawing showing the temperature distribution of the workpiece in a circumference direction in a case where the workpiece is heated by means of the high frequency induction heating coil at a frequency of 50 kHz and a transporting speed of 20 mm/s;

FIG. 10A shows an example of the present invention;

FIG. 10B shows a conventional example;

FIG. 12 includes an explanation drawing showing a situation in which a high frequency quenching and a bending processing are carried out at the same time by means of 3DQ to a hollow steel workpiece having a closed cross section and an outward flange;

FIG. 13 includes an explanation drawing conceptually showing a reason why the outward flange of the workpiece is not heated;

DESCRIPTION OF EMBODIMENTS

Figure 2A:
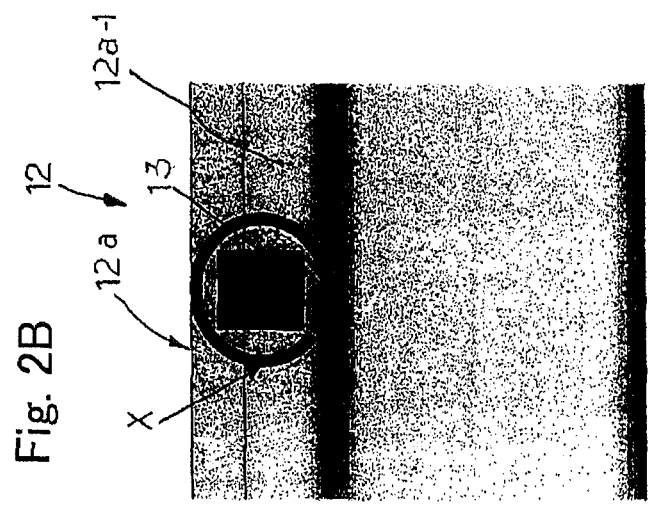
FIG. 2A is a view of the magnetic material core and the induction heating coil seen from a direction of the arrow D in FIG. 1A.

The present invention will be described with reference to the drawings. FIG. 1 is an explanation drawing showing a high frequency induction heating coil 11 in a high frequency induction heating apparatus 10 of the present invention. FIG. 1A is a perspective view, FIG. 1B is a view seen from a direction shown by the arrow A in FIG. 1A, and FIG. 1C is a view seen from a direction shown by the arrow B in FIG. 1A.

As shown in FIGS. 1A to 10, the high frequency induction heating apparatus 10 is provided with a high frequency induction heating coil 11 and carries out high frequency induction heating to a workpiece 12 by means of the high frequency induction heating coil 11.

The workpiece 12 is a long hollow member made of steel, having a closed cross section and consisting of an outward flange 12a and a general portion 12b which is a portion where the outward flange 12a is excluded from the workpiece 12. At the outward flange 12a, two steel sheets are joined by means of an appropriate means (e.g. welding such as spot welding), in a manner to overlap with each other.

The high frequency induction heating coil 11 is used for heating the workpiece 12, when 3DQ is carried out in which a bending member is manufactured by forming a high temperature portion which moves in the longitudinal direction of the workpiece 12 in the workpiece 12, and at the same time adding an external force to the high temperature portion.

The high frequency induction heating coil 11 includes a magnetic material core 13 and an induction heating coil 14. The magnetic material core 13 is a so-called ferrite core, which is a ferromagnetic body of a Fe oxide sintered as a ceramic. The magnetic material core 13 has a material having a magnetic property and high electric resistance. Specifically, the magnetic material core 13 has a relative magnetic permeability of at least 3 or more, and an electrical resistivity of at least 1 $\Omega$m or more . The material of the magnetic material core 13 is not necessarily limited to the ferrite core, and can be another material having the same or more of physical property.

The magnetic material core 13 is arranged having a distance from the both faces of the outward flange 12a of the workpiece 12 (one face 12a-1 and the other face 12a-2) as shown in FIG. 10. The magnetic material core 13 is arranged facing each other, and the both faces 12a-1 and 12a-2 are interposed between the magnetic material core 13.

On the other hand, the induction heating coil 14 is connected to the magnetic material core 13 and arranged in a manner to surround an outer circumference of the general portion 12b, where the outward flange 12a is excluded from the workpiece 12. That is, the induction heating coil 14 includes: a first portion 14-1 connected to a high frequency power generator which is not shown; a second portion 14-2 connected to the first potion 14-1 and extended in the longitudinal direction of the workpiece 12; a third portion 14-3 connected to the second portion 14-2 and arranged in a manner to surround the circumference of the general portion 12b of the workpiece 12; a fourth portion 14-4 connected to the third portion 14-3 and extended in the longitudinal direction of the workpiece 12; and a fifth portion 14-5 connecting the fourth portion 14-4 and the high frequency power generator not shown.

The symbol 15 in FIG. 1B shows an insulating plate. The transporting direction of the workpiece 12 is a direction in which the fifth portion 14-5 of the induction heating coil 14 in FIGS. 1A to 10 is determined as an upstream side, and the third portion 14-3 of the induction heating coil 14 is determined as a downstream side.

As can be seen from FIGS. 1A to 10, the magnetic material core 13 is arranged in a manner to cross the fourth portion 14-4 of the induction heating coil 14. Also, the magnetic material core 13 has portions 13-1 and 13-2 parallel to the outward flange 12a, on the upstream side in the transporting direction of the workpiece 12, that is, on the downstream side in the moving direction of the high temperature portion in the workpiece 12. The portions 13-1 and 13-2 generate a magnetic flux to the outward flange 12a in a vertical direction.

The arrow shown at the vicinity of the induction heating coil 14 in FIG. 1A shows a direction of the current which flows in the induction heating coil 14. As shown in FIG. 1A, the magnetic material core 13 is arranged in a manner to be positioned between two portions 14-2 and 14-4 of the induction heating coil 14, wherein the direction of the current flowing in the portion 14-2 and the direction of the current flowing in the portion 14-4 are opposite from each other.

The magnetic material core 13 is preferably arranged on a more upstream side in the transporting direction of the workpiece 12 than the third portion 14-3 which is arranged surrounding the circumference of the general potion 12b of the workpiece 12, that is, only on the downstream side in the moving direction of the high temperature portion of the workpiece 12. This is because: if the magnetic material core 13 is arranged on a more downstream side in the transporting direction of the workpiece 12 than the third portion 14-3, that is, the upstream side in the moving direction of the high temperature portion of the workpiece 12, a cooling starting position of the workpiece 12 to be cooled by the water-cooling apparatus 6 of the processing apparatus 0 becomes farther from the induction heating coil 14 by a degree that the magnetic material core 13 is arranged on the downstream side in the transporting direction of the workpiece 12, whereby the heating width of the general portion 12b where the outward flange 12a is excluded becomes larger.

Figure 2B:
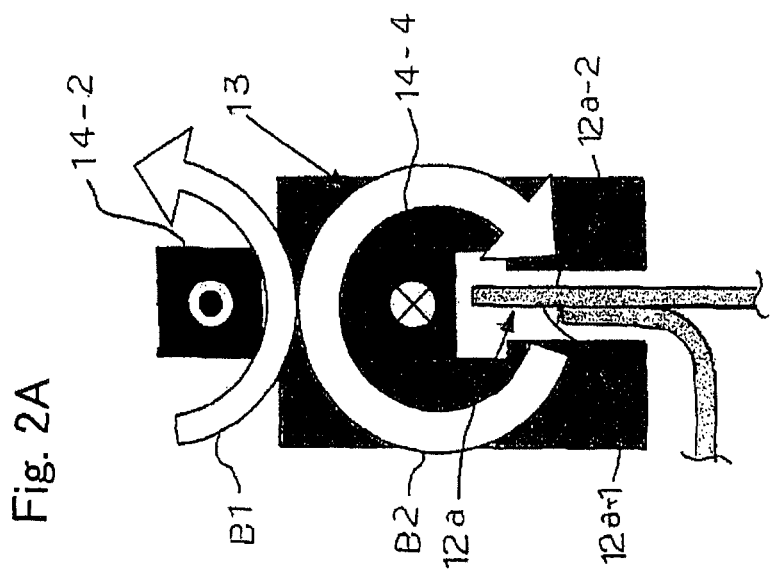
FIG. 2B is a view of the magnetic material core and the induction heating coil seen from a direction of the arrow A in FIG. 1A.

FIG. 2 includes an explanation diagram showing the principle of heating the outward flange 12a by the present invention. FIG. 2A is a view of the magnetic material core 13 and the induction heating coil 14 seen from a direction shown by the arrow D in FIG. 1A, and FIG. 2B is a view of the magnetic material core 13 and the induction heating coil 14 seen from a direction shown by the arrow A in FIG. 1A.

The reason why the outward flange 12a can be heated by the present invention is as follows. As shown in FIG. 2A, the direction of the coil current flowing in the second portion 14-2 of the induction heating coil 14 and the direction of the coil current flowing in the fourth portion 14-4 of the induction heating coil 14 are opposite from each other. Therefore, magnetic fluxes B1 and B2 (shown by void arrows in FIG. 2A) generated to the magnetic material core 13 are mutually intensified. By the magnetic material core 13, the fluxes B1 and B2 are induced so as to penetrate the outward flange 12a.

Figure 13A:
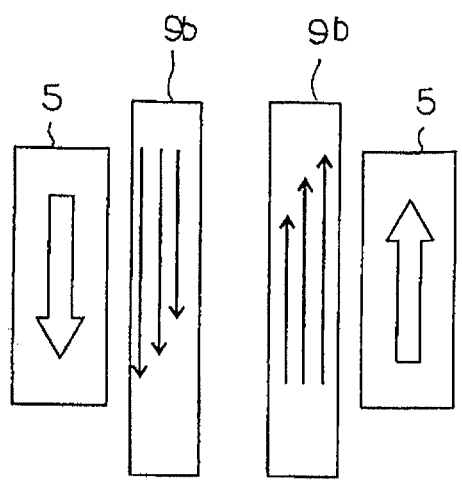
FIG. 13A shows a flow of a coil current which flows in the high frequency induction heating coil and a flow of an eddy current generated in the workpiece, in a case where the penetration depth of an electromagnetic wave at the general portion of the workpiece from which the outward flange is excluded is larger than the sheet thickness of the workpiece.
Figure 13B:
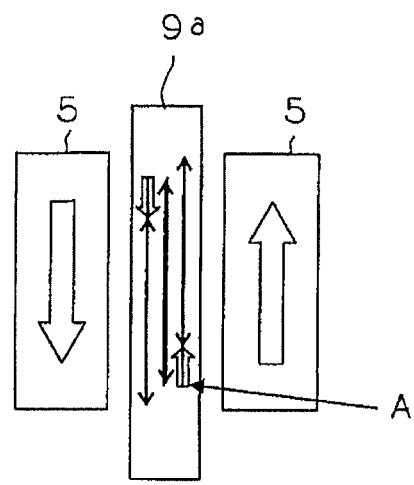
FIG. 13B shows flows of the coil current and the eddy current in a case where the penetration depth of an electromagnetic wave at the outward flange of the workpiece is larger than the sheet thickness of the workpiece.
Figure 13C:
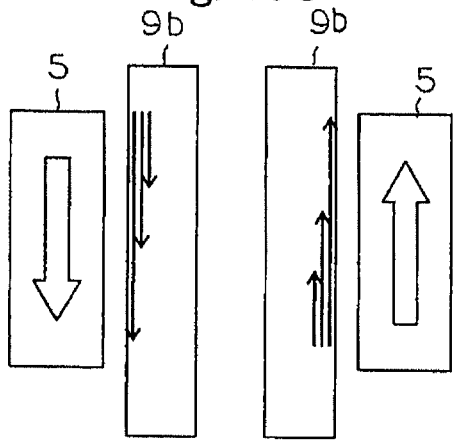
FIG. 13C shows flows of the coil current and the eddy current in a case where the penetration depth of an electromagnetic wave at the general portion of the workpiece is smaller than the sheet thickness of the workpiece.
Figure 13D:
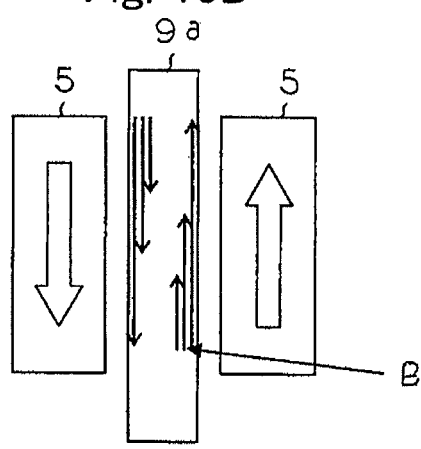
FIG. 13D shows flows of the coil current and the eddy current in a case were the penetration depth of an electromagnetic wave at the outward flange of the workpiece is smaller than the sheet thickness of the workpiece.
Figure 14:
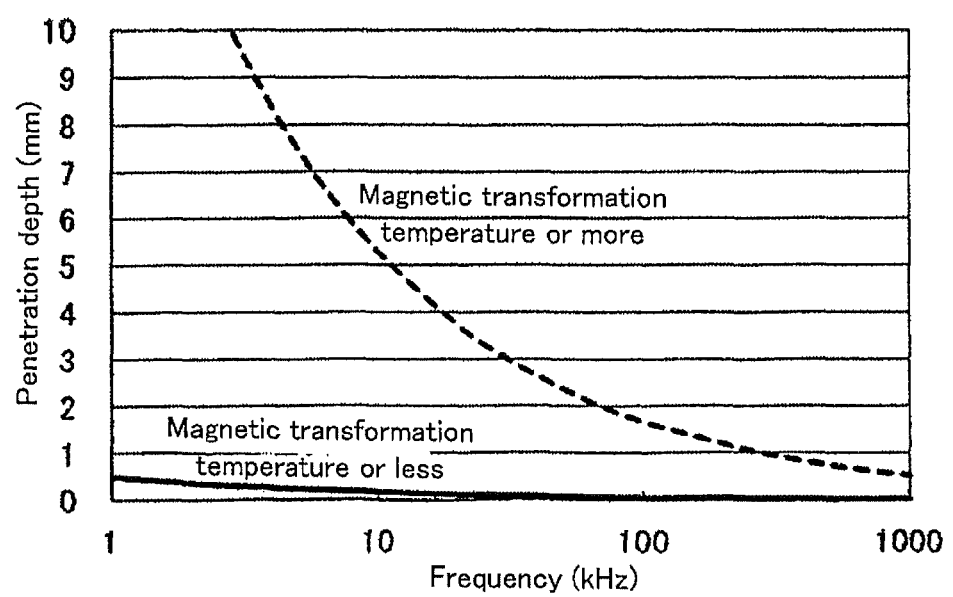
FIG. 14 is a graph showing a relationship between the frequency and penetration depth of the current of the high frequency induction heating coil.

Accordingly, the fluxes B1 and B2 vertically enter the outward flange 12a, whereby an eddy current X is generated at the outward flange 12a as shown in FIG. 2B. In this case, the flowing direction of the eddy current X is same at the adverse side 12a-1 of the outward flange 12a and at the reverse side 12b-1. Therefore, the cancellation of the eddy current as shown in FIG. 13b does not occur, whereby it is possible to heat the outward flange 12a.

It is most preferable that the fluxes B1 and B2 to be induced by the magnetic material core 13 vertically enter the outward flange 12a (90° of incident angle). The fluxes B1 and B2 need to have at least an incident angle which enables the fluxes B1 and B2 to penetrate the outward flange 12a, and the incident angle is preferably 30° or more.

As described above, it is possible to heat the outward flange 12a by the present invention. Also the present invention does not use a high frequency induction heating coil having a shape offsetting to both sides in the axial direction of the workpiece 12 along the outward flange 12a as the invention disclosed in Patent Literature 2. In the present invention, in order to arrange the magnetic material core 13 on the upstream side in the transporting direction of the workpiece 12, the induction heating coil 14 is arranged offsetting only to the upstream side in the transporting direction of the workpiece 12. Therefore, the increase amount of the heating width in the present invention is a half or less of that of the invention disclosed in Patent Literature 2 wherein the induction heating coil 14 is arranged offsetting to both sides in the transporting direction of the workpiece 12. Thus, the high frequency induction heating coil 11 is extremely suitable for heating the workpiece 12 in 3DQ.

The effect of the high frequency induction heating coil 11 was confirmed by a numerical analysis simulation. In the numerical analysis simulation, the distribution of heat generation amount in the induction heating was calculated by means of electromagnetic field analysis. From the obtained distribution of heat generation amount, a heat transfer analysis was carried out, whereby the temperature distribution of a hollow workpiece 12 consisting of a steel sheet having a thickness of 1 mm was calculated. The calculation was carried out under the conditions with which the center portion of the base of the general portion 12b of the workpiece 12 has a temperature of 1050° C., as a heating condition of the numerical analysis.

Figure 3A:
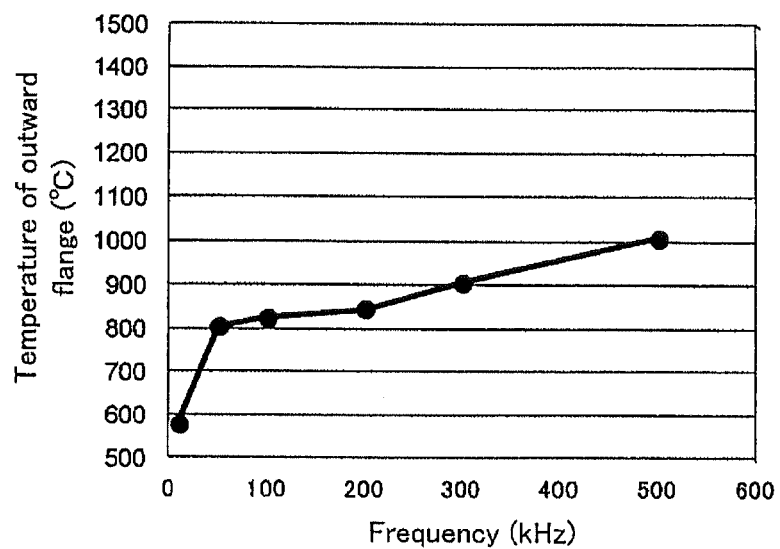
FIG. 3A is a graph showing a relationship between the frequency of the current of the high frequency induction heating coil and the temperature of the outward flange.
Figure 3B:
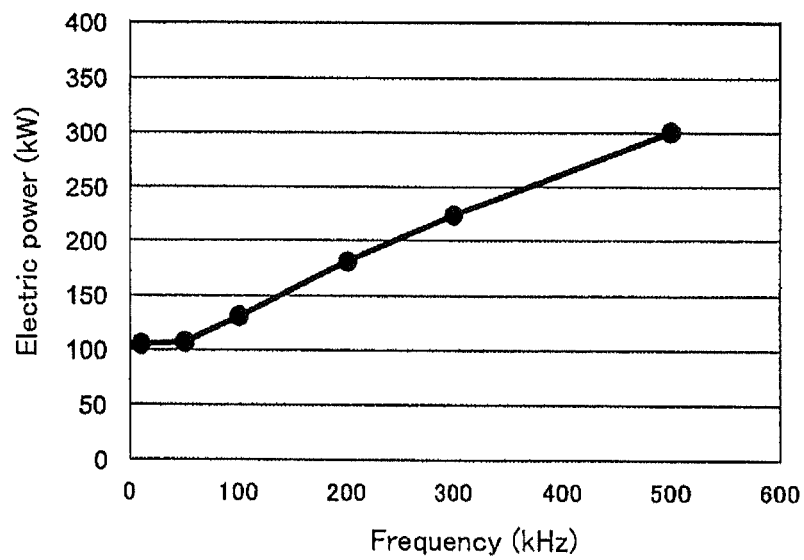
FIG. 3B is a graph showing a relationship between the frequency and the electric power.
Figure 12B:
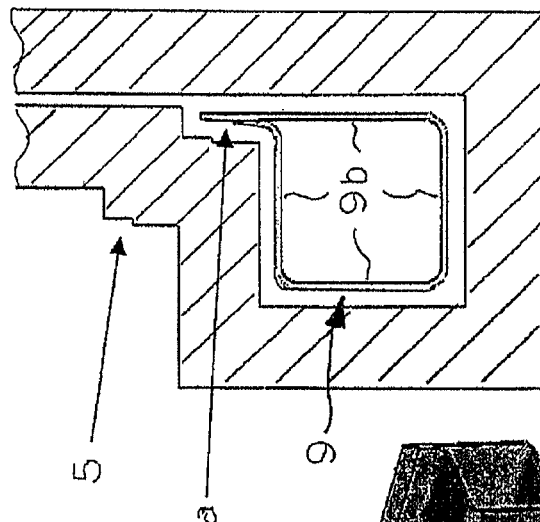
FIG. 12B is a cross-sectional view taken along the line C-C in FIG. 12A.
Figure 12A:
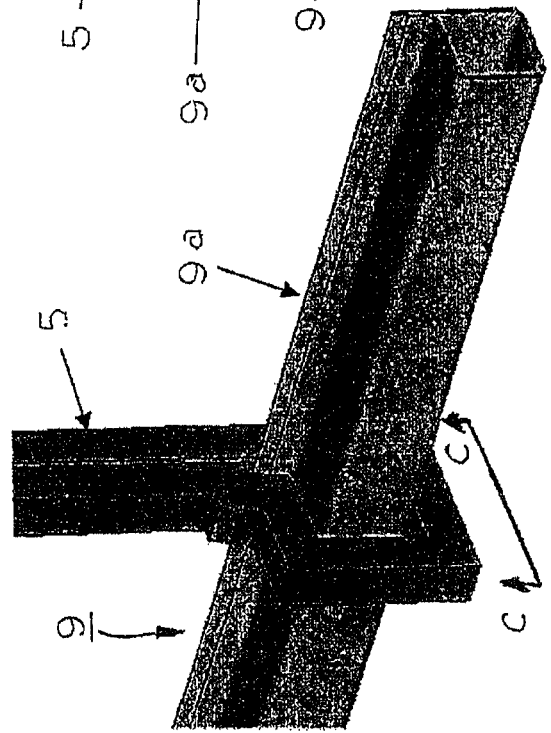
FIG. 12A is a perspective view.

Firstly, the calculation result of the relationship between the current frequency of the high frequency induction heating coil 5 and the temperature of the outward flange 9a in a case where the conventional high frequency induction heating coil 5 shown in FIGS. 12A and 12B was used is shown by the graph in FIG. 3A. Here, the temperature of the outward flange 9a is a temperature at an end portion of the outward flange 9a. Also, the electric power required to heat the center portion of the base of the general portion 9b of the workpiece 9 to 1050° C. is shown by the graph in FIG. 3B.

As shown by the graph in FIG. 3A, in a case where the conventional high frequency induction heating apparatus 5 was used, the current frequency of the high frequency induction heating coil 5 was needed to be increased to 300 kHz or more in order to heat the outward flange 9a to 900° C. or more. Also, as shown by the graph in FIG. 3B, the required electric power increased as the frequency increased. For example, only 100 kW of electric power was required when a power source of 10 kHz was used; however 225 kW of electric power was required when a power source of 300 kHz was used. The reason for the increase in the electric power consumption as the frequency of the current of the high frequency induction heating apparatus 5 increases is that the number of alternation of the magnetic field per unit time increases as the frequency increases. Here, if the magnetic field is generated only at the workpiece 9 and all the energy which alternates the magnetic field is consumed for heating, the electric power consumption does not largely increase. However, the high frequency induction heating apparatus 5 generates the magnetic field not only to the workpiece 9 but also to the surrounding open space. Even though the magnetic field generated to the open space is not related to the heating, it alternates the magnetic field in the open space to thereby consume energy. Therefore, electric power consumption largely increases.

Figure 4A:
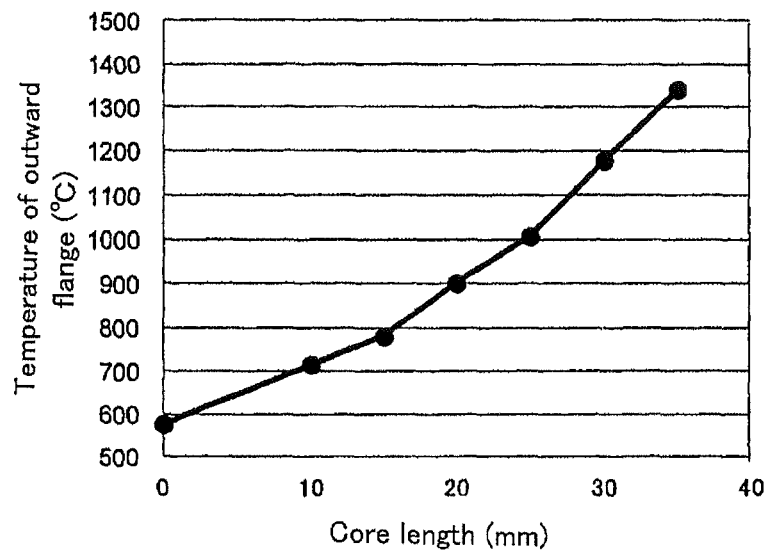
FIG. 4A is a graph showing a relationship between the length of the magnetic material core (core length) in the longitudinal direction of the workpiece and the temperature of the outward flange.
Figure 4B:
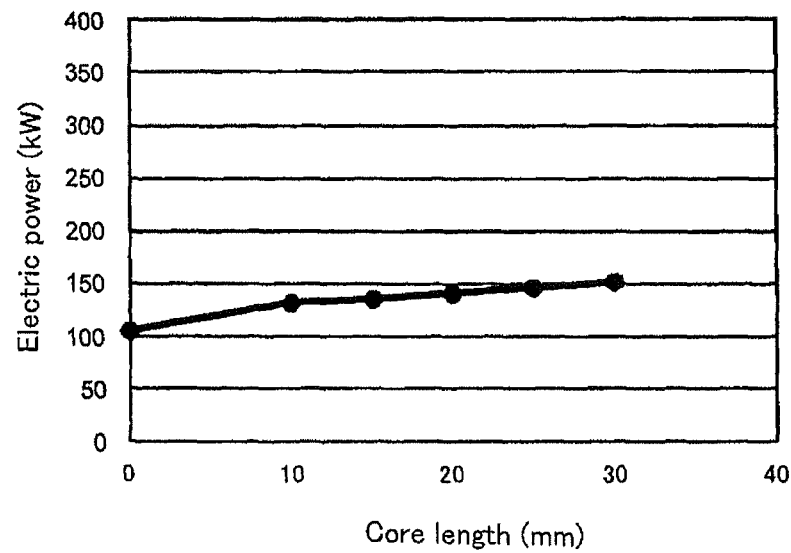
FIG. 4B is a graph showing a relationship between the core length and the electric power consumption.

FIG. 4 includes a graph showing the calculation results by a numerical analysis in a case where the high frequency induction heating apparatus 11 according to the present invention shown in FIGS. 1A to 10 was used. FIG. 4A shows the relationship between the length of the magnetic material core 13 in the longitudinal direction of the workpiece 12 (core length) and the temperature of the outward flange 12a. FIG. 4B shows the relationship between the core length and the electric power consumption. Here, the frequency of the current carried to the high frequency induction coil 11 was 10 kHz, and the transporting speed of the workpiece 12 was 80 mm/s.

As shown by the graph in FIG. 4A, the outward flange 12a became easier to be heated as the core length became longer. The core length 0 mm in the graph in FIG. 4A shows a case where the magnetic material core 13 was not used and the outward flange 12a was heated by means of the conventional high frequency induction heating apparatus 5. In this case, the outward flange 12a was heated only to approximately 580° C.

In order to carry out the high frequency quenching to the workpiece 12, the workpiece 12 needs to be heated to 900° C. or more. On the other hand, if the workpiece 12 is heated to more than 1200° C., enlargement and oxidation of crystal grains are progressed, whereby the surface of the bending member to be manufactured by 3DQ becomes rough. Therefore, the heating temperature of the workpiece 12 is adequate within a range of 900° C. and 1200° C.

Here, it is shown from the graph in FIG. 4A that, in order to heat the outward flange 12a of the workpiece 12 to 900° C. or more and 1200° C. or less, the core length of the magnetic material core 13 can be set as 19.9 mm or more and 30.7 mm or less. Also, from the graph in FIG. 4B, it is shown that: the electric power consumption was 105 kW in a case where the magnetic material core 13 was not used (in a case where the core length was 0 mm) ; whereas the electric power consumption was 140 kW in a case where the core length of the magnetic material core 13 which can heat the workpiece 12 to 900° C. was set for example as 20 mm. Compared with the fact that the electric power consumption was 225 kW in a case where the normal induction heating coil 5 was used to heat the outward flange 12a to 900° C. with 300 kHz of frequency, the electric power consumption by means of the high frequency induction heating coil 11 was smaller by approximately 80 kW.

As shown by the graph in FIG. 3A, the outward flange 12a becomes easier to be heated as the frequency of the current of the high frequency induction heating coil 11 increases. Therefore, as the frequency of the current of the high frequency induction heating coil 11 increases, it is possible to shorten the core length of the magnetic material core 13.

Figure 5:
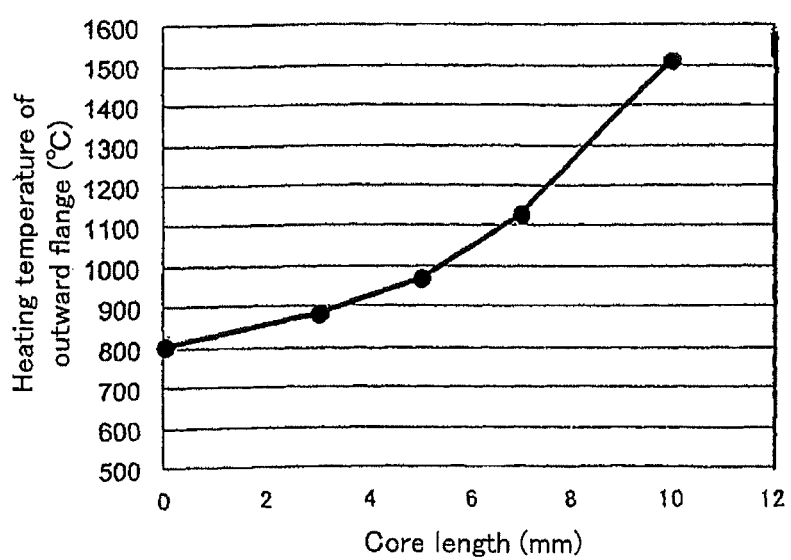
FIG. 5 is a graph showing a relationship between the core length of the magnetic material core and the heating temperature of the outward flange in a case where the current frequency of the high frequency induction heating coil is 50 kHz.

FIG. 5 is a graph showing the relationship between the core length of the magnetic material core 13 and the heating temperature of the outward flange 12a in a case where the frequency of the current of the high frequency induction heating coil 11 was set as 50 kHz.

In this case, in order to heat the outward flange 12a from 900° C. to 1200° C., the core length of the magnetic material core 13 can be set as 3.4 mm or more and 7.5 mm or less.

Figure 6:
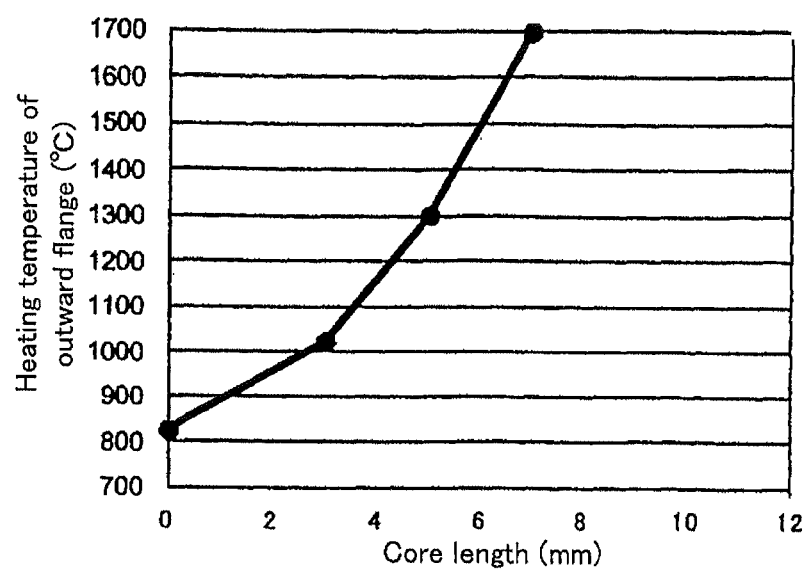
FIG. 6 is a graph showing a relationship between the core length of the magnetic material core and the heating temperature of the outward flange in a case where the current frequency of the high frequency induction heating coil is 100 kHz.

In the same way, the graph in FIG. 6 shows the relationship between the core length of the magnetic material core 13 and the heating temperature of the outward flange 12a in a case where the frequency of the current of the high frequency induction heating coil 11 was set as 100 kHz. In a case where the current frequency of the high frequency induction heating coil 11 is 100 kHz or more, the core length of the magnetic material core 13 can be set as 1.2 mm or more and 4.3 mm or less.

As described above, as the frequency of the current of the high frequency induction heating coil 11 is higher and the core length of the magnetic material core 13 is longer, the heating temperature of the outward flange 12a becomes higher. Table 1 collectively shows a relationship between the core length of the magnetic material core 13 and the frequency of the current of the high frequency induction heating coil 11 to heat the outward flange 12a to 900° C. or more and 1200° C. or less, in a case where the transporting speed of the workpiece 12 was 80 mm/s.

TABLE 1

| Frequency f (kHz) | Core length L (mm) |
| --- | --- |
| 10 | 19.9~30.7 |
| 50 | 3.4~7.5 |
| 100 | 1.2~4.3 |

Table 1 shows the results in a case where the transporting speed of the workpiece 12 was 80 mm/s. However, the adequate core length of the magnetic material core 13 changes depending on the transporting speed of the workpiece 12. Table 2 collectively shows the relationship between the core length of the magnetic material core 13 and the frequency of the current of the high frequency induction heating coil 11 to heat the outward flange 12a to 900° C. or more and 1200° C. or less, in a case where the transporting speed of the workpiece 12 was 20 mm/s. Table 3 collectively shows the relationship between the core length of the magnetic material core 13 and the frequency of the current of the high frequency induction heating coil 11 to heat the outward flange 12a to 900° C. or more and 1200° C. or less, in a case where the transporting speed of the workpiece 12 was 160 mm/s.

TABLE 2

| Frequency f (kHz) | Core length L (mm) |
|---|---|
| 10 | 10.1~16.7 |
| 50 | 2.6~5.0 |
| 100 | 1.1~3.4 |

TABLE 3

| Frequency f (kHz) | Core length L (mm) |
|---|---|
| 10 | 25.9~43.8 |
| 50 | 4.0~10.2 |
| 100 | 1.2~5.2 |

Figure 7:
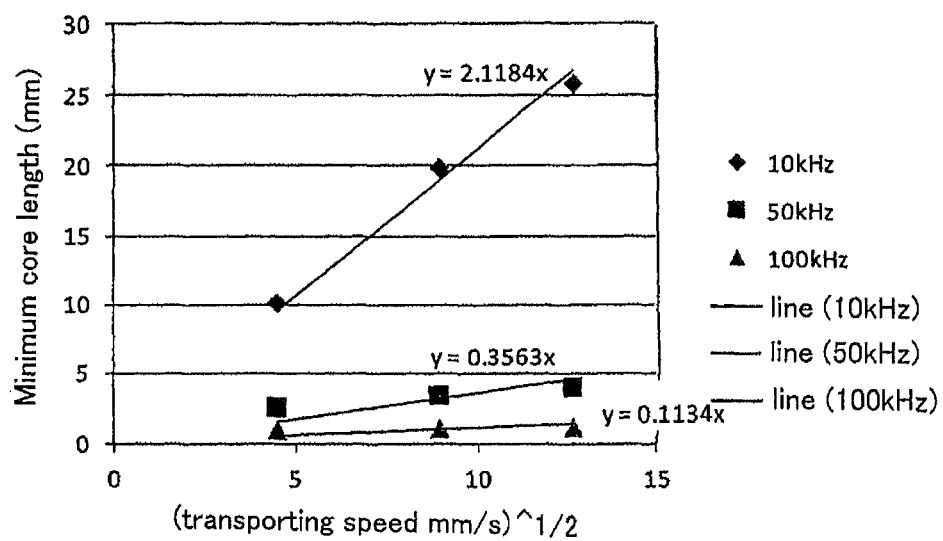
FIG. 7 is a graph showing results of sorting out the minimum value of the adequate core length of the magnetic material core shown in Tables 1 to 3.

FIG. 7 is a graph showing the results of sorting out the minimum value of the adequate core length of the magnetic material core 13 shown in Tables 1 to 3. In the same way, FIG. 8 is a graph showing the results of sorting out the maximum value of the adequate core length of the magnetic material core 13.

Figure 8:
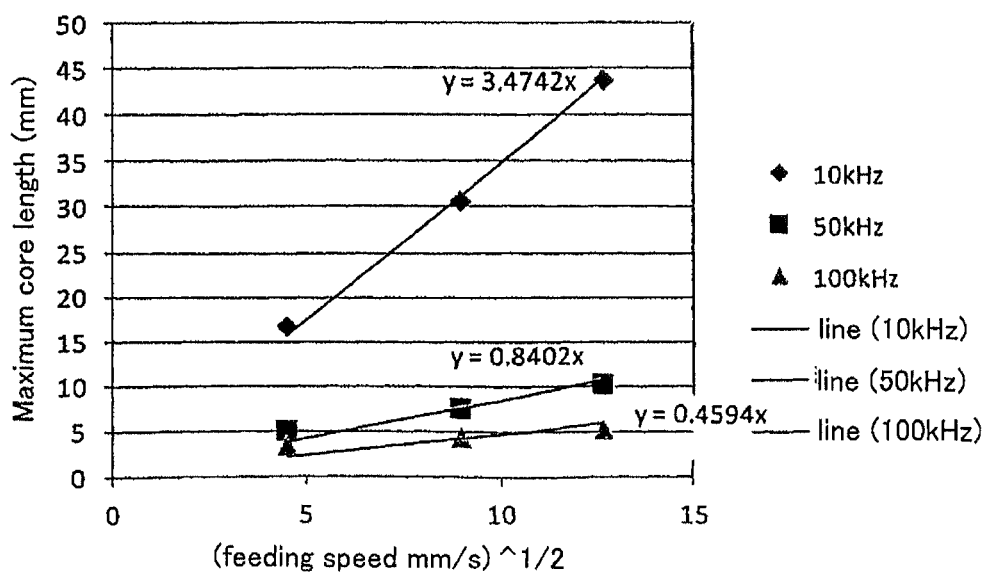
FIG. 8 is a graph showing results of sorting out the maximum value of the adequate core length of the magnetic material core.

As shown by the graphs in FIGS. 7 and 8, both the minimum value and the maximum value of the adequate core length of the magnetic material core 13 were approximated by the ½ power of the transporting speed V of the workpiece 12. From the graphs in FIGS. 7 and 8, the adequate length L (mm) of the magnetic material core 13 can be obtained as $a_{min}V^{1/2} < L < a_{max}V^{1/2}$.

Figure 9:
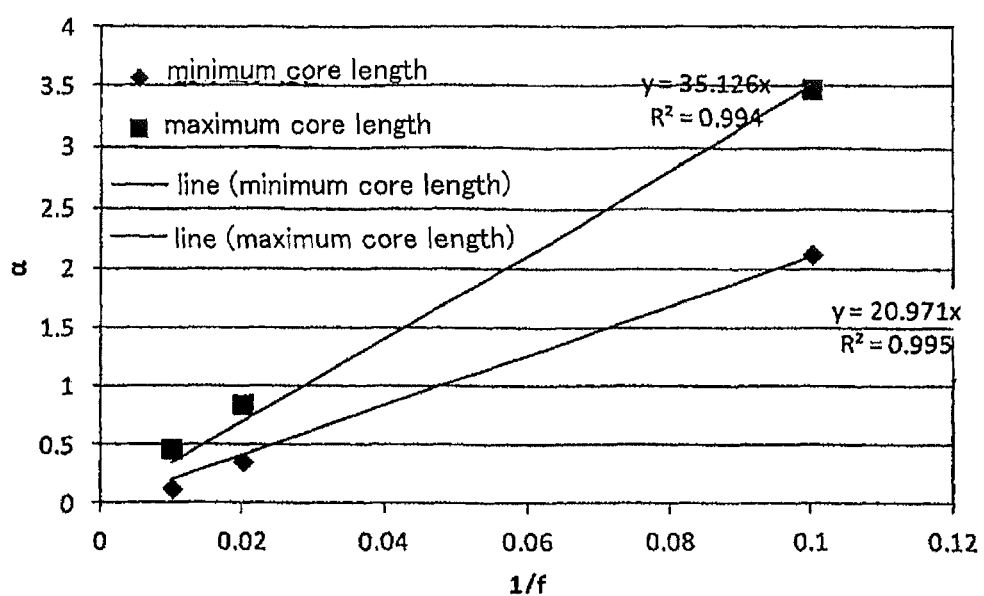
FIG. 9 is a graph showing examination results of the frequency dependence of the coefficient a in the graphs in FIGS. 7 and 8.

Next, FIG. 9 is a graph showing the examination results of the frequency dependence of the coefficient a in FIGS. 7 and 8.

As shown by the graph in FIG. 9, it became clear that the coefficient a depends on the inverse number of the frequency f (kHz) of the current of the high frequency induction heating coil.

From the above, in order to adequately set the core length of the magnetic material core 13, it is desirable to satisfy the following Formula 1, wherein L (mm) is the length of the magnetic material core 13 in the longitudinal direction of the workpiece 12, f (kHz) is the frequency of the current of the high frequency induction heating coil 11, and v (mm/s) is the moving speed of the high temperature portion in the workpiece 12 (transporting speed of the workpiece 12).

$$\frac{21}{f}\sqrt{V} < L < \frac{35}{f}\sqrt{V} \qquad (1)$$

FIG. 10 includes an explanation diagram showing the temperature distribution in the circumference direction of the workpieces 12 and 9, in a case where the workpieces 12 and 9 were heated by means of the high frequency induction heating coils 11 and 5. FIG. 10A shows an example of the present invention, and FIG. 10B shows a conventional example.

In a case where the present invention was applied, the core length of the magnetic material core 13 was predicted as 1.9 mm or more and 3.1 mm or less, and the length of the magnetic material core was 3 mm.

As shown in FIGS. 10A and 10B, each temperature of the workpieces 12 and 9 in Example and Comparative Example was equally 1050° C.; however, it was shown that the temperature of the outward flange 9a of Comparative Example was less than 900° C. whereas the temperature of the outward flange 12a of Example was heated to 900° C. or more.

Figure 11:
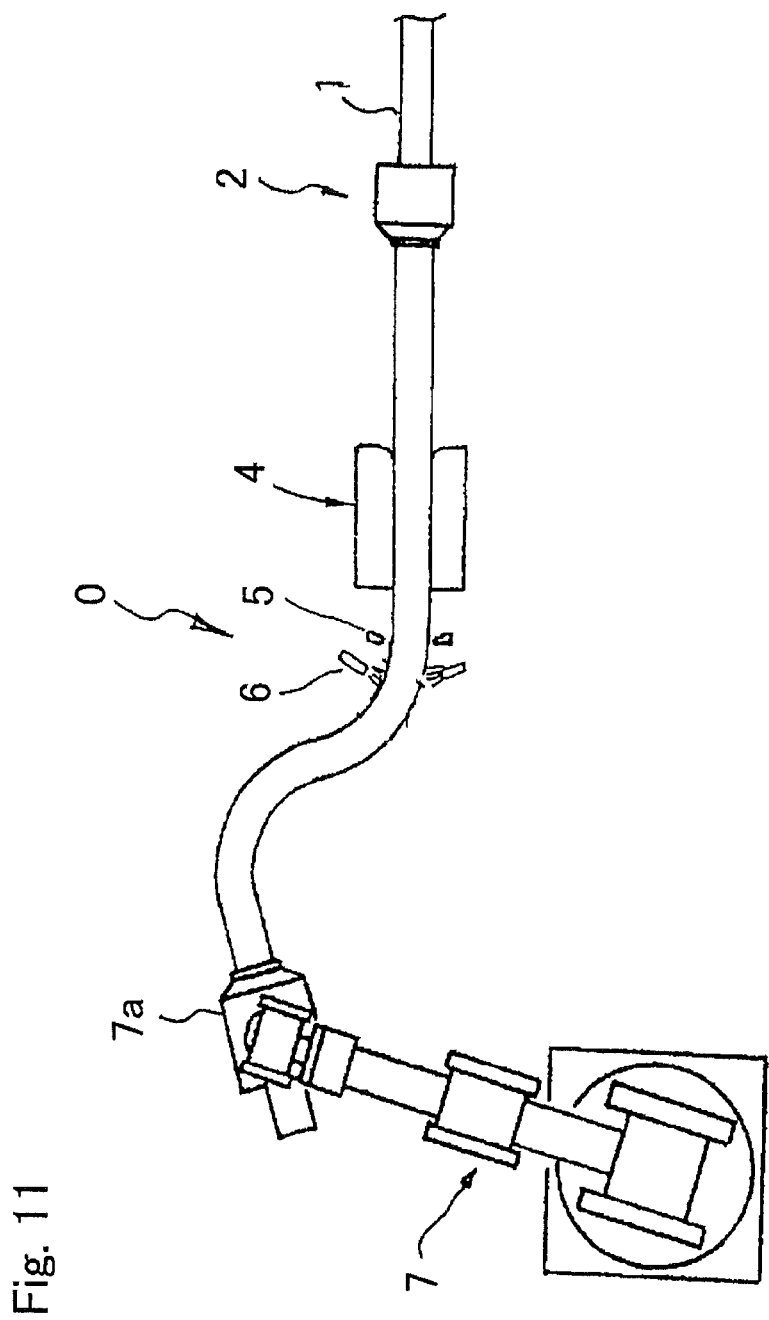
FIG. 11 is an explanation drawing showing a situation in which a bending member is manufactured by 3DQ.

By employing the high frequency induction heating apparatus 10 explained above in place of the high frequency induction heating apparatus 5 of the processing apparatus 0 shown in FIG. 11, it is possible to provide a processing apparatus having the above-mentioned effects.

DESCRIPTION OF REFERENCE NUMERALS 10 high frequency induction heating apparatus
11 high frequency induction heating coil
12 workpiece
12a outward flange
12a-1, 12a-2 face
12b general portion
13 magnetic material core
13-1, 13-2 portion parallel to outward flange
14 induction heating coil
14-1 to 14-5 first portion to fifth portion

The invention claimed is:

1. A high frequency induction heating apparatus comprising:
a high frequency induction heating coil used for heating a long hollow steel workpiece having a closed cross section and an outward flange having two faces,
wherein the high frequency induction heating coil comprises a magnetic material core and an induction heating coil,
wherein the induction heating coil is connected to the magnetic material core and arranged surrounding an outer circumference of a portion of the workpiece where the outward flange is excluded from the workpiece, the induction heating coil further comprising a first portion connected to a high frequency power generator, a second portion connected to the first portion and extended in the longitudinal direction of the workpiece, a third portion connected to the second portion and arranged surrounding the outer circumference of the portion of the workpiece, a fourth portion connected to the third portion and extended in the longitudinal direction of the workpiece, and a fifth portion connecting the fourth portion and the high frequency power generator, the fifth portion being positioned adjacent to the first portion, and
the magnetic material core is positioned between the second portion and the fourth portion and positioned to surround the fourth portion, and the magnetic material core has two portions arranged facing each other so that both of the faces of the outward flange are interposed between the two portions, the magnetic material core having a distance from the both of the faces.

2. The high frequency induction heating apparatus according to claim 1, wherein a current which flows in the second portion and a current which flows in the fourth portion flow in the opposite direction from each other.

3. The high frequency induction heating apparatus according to claim 1, wherein the following Formula 1 is satisfied, wherein L (mm) is a length of the magnetic material core in the longitudinal direction of the workpiece, f (kHz) is a current frequency of the induction heating coil, and v (mm/s) is a moving speed of the high temperature portion of the workpiece $$\frac{21}{f}\sqrt{V} < L < \frac{35}{f}\sqrt{V}. \qquad (1)$$

4. A processing apparatus comprising:
the high frequency induction heating apparatus according to any one of claims 1, 2, and 3;
a water-cooling apparatus arranged adjacent to a downstream side of the high frequency induction heating apparatus; and
an articulated robot arranged on a downstream side of the cooling apparatus and supporting the workpiece to add an external force to the workpiece.

\* \* \* \* \*